United States Patent
Shellabarger

(10) Patent No.: US 6,481,733 B1
(45) Date of Patent: Nov. 19, 2002

(54) STEP FOR ENTERING AND EXITING A VEHICLE AND METHOD OF MAKING SAME

(75) Inventor: Jay Shellabarger, Shelby Township, MI (US)

(73) Assignee: Patent Holding Company, Fraser, MI (US)

( * ) Notice: Subject to any disclaimer, the term of this patent is extended or adjusted under 35 U.S.C. 154(b) by 0 days.

(21) Appl. No.: 09/620,169

(22) Filed: Jul. 20, 2000

(51) Int. Cl.[7] .............................. E04G 3/10; B60R 3/00
(52) U.S. Cl. ..................... 280/163; 280/169; 182/150
(58) Field of Search ....................... 280/163, 164.1, 280/164.2, 169; 182/90, 91, 92, 150

(56) References Cited

U.S. PATENT DOCUMENTS

| | | | |
|---|---|---|---|
| 547,158 A | * 10/1895 | Root | 280/163 |
| 3,488,066 A | * 1/1970 | Hansen | 280/163 |
| 3,515,406 A | * 6/1970 | Endsley | 280/163 |
| 3,716,254 A | 2/1973 | Tarvin | |
| 3,887,216 A | * 6/1975 | Perry | 280/163 |
| 4,054,299 A | * 10/1977 | Urbaitis | 280/163 |
| 4,079,815 A | 3/1978 | Cormier | |
| T977,005 I4 | * 12/1978 | Sidles, Jr. et al. | 280/163 |
| D293,667 S | * 1/1988 | Weiler | 280/163 |
| 4,869,520 A | 9/1989 | Cole | |
| 4,943,085 A | * 7/1990 | Straka | 280/163 |
| 5,028,063 A | 7/1991 | Andrews | |
| 5,265,896 A | * 11/1993 | Kravitz | 280/163 |
| 5,291,780 A | 3/1994 | Thomas et al. | |
| 5,335,752 A | 8/1994 | Kozlowski | |
| 5,713,589 A | 2/1998 | Delgado et al. | |
| D394,628 S | * 5/1998 | Wentzel | 280/163 |
| 5,897,125 A | 4/1999 | Bundy | |
| 6,042,355 A | 3/2000 | Murphy et al. | |
| 6,044,928 A | 4/2000 | Law et al. | |
| 6,053,720 A | 4/2000 | Winget et al. | |
| 6,173,979 B1 | * 1/2001 | Bernard | 280/163 |
| 6,224,134 B1 | * 5/2001 | Johnson et al. | 280/163 |

* cited by examiner

Primary Examiner—Brian L. Johnson
Assistant Examiner—Jeff Restifo
(74) Attorney, Agent, or Firm—Brooks & Kushman P.C.

(57) ABSTRACT

A step for entering and exiting a vehicle. The step is a unitary one piece mold having at least two hollow U-shaped portions wherein each portion has a receding body section and first and second legs extending from the body section to first and second distal ends respectively. Each distal end has a flange configured to be mounted to a vehicle. The one piece mold further has a plate portion on the respective receiving body section for supporting weight placed thereon and integrally bridging and joining the at least two U-shaped portions together.

6 Claims, 2 Drawing Sheets

STEP FOR ENTERING AND EXITING A VEHICLE AND METHOD OF MAKING SAME

TECHNICAL FIELD

The present invention relates to a gas assisted injection molded step for entering and exiting a vehicle.

BACKGROUND ART

There is a need to improve steps used to assist in entering and exiting vehicles. Typically, a vehicle, e.g., a utility vehicle, includes a step mounted thereto to assist a driver or a passenger in entering and exiting the vehicle. However, many steps that are used include a plurality of members, thereby requiring a relatively substantial amount of time of assembling the step.

Additionally, many steps that are used are relatively high in weight, thereby increasing manufacturing and assembling costs. Moreover, the steps having a relatively high weight unnecessarily requires fasteners to hold the extra weight.

Thus, what is needed is an improved vehicle step which reduces the cost of manufacturing and assembling the step to a vehicle.

What is also needed is an improved vehicle step which is substantially less in weight without compromising the structural strength of the step.

DISCLOSURE OF INVENTION

It is an object of the present invention to provide for an improved step for entering and exiting a vehicle. The step includes a unitary, one-piece molding which has at least two hollow u-shaped portions wherein each portion has a receiving body section and first and second legs extending from the body section to first and second distal ends respectively. Each distal end has a flange configured to be mounted to the vehicle. The unitary, one-piece molding also has a plate portion disposed on the respective receiving body section for supporting weight placed thereon and integrally bridging and joining the at least two u-shaped portions together.

It is another object of the present invention to provide for a step mounted to a vehicle for entering and exiting the vehicle and manufactured by the process of gas assisted injection molding.

BEST MODE FOR CARRYING OUT THE INVENTION

Figure 1:
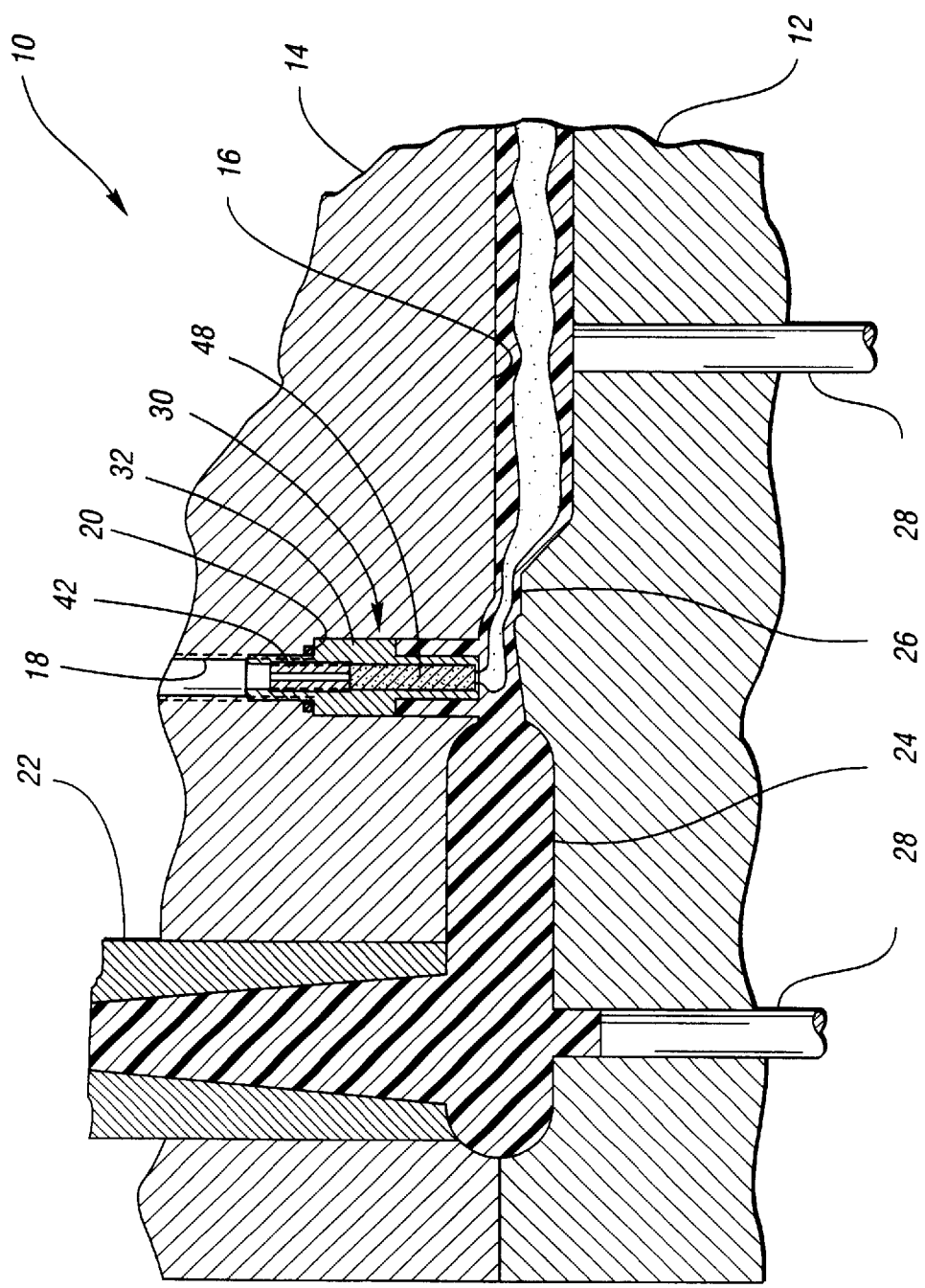
FIG. 1 is a view, partially broken away and in cross-section, of a mold constructed in accordance with the present invention showing a typical gas path through a shot of thermoplastic resin.

Referring now to the drawing Figures, there is illustrated in FIG. 1 a mold, generally indicated at 10, for use in a gas-assisted injection molding system. The mold 10 includes a first mold half 12 and a second mold half 14. The first and second mold halves 12 and 14, respectively, are movable relative to each other between an open position and a closed position as shown in FIG. 1, wherein the first and second mold halves 12 and 14 respectively define an article-defining cavity 16.

The second mold half 14 includes a gas passageway 18 which extends from an exterior surface (not shown) of the second mold half 14 to an inner interior surface 20 of the second mold half 14 in fluid communication with the article-defining cavity 16.

The second or stationary mold half 14 includes a sprue 22 for communicating thermoplastic material to a runner 24 which, in turn, communicates with the article-defining cavity 16 via a gate 26. A thermoplastic flow path is defined by the sprue 22, the runner 24 and the gate 26. Ejector pins 28 extend through the first or movable mold half 12 and may be connected to an ejector plate (not shown). The ejector plate is supported to move relative to the first mold half 12 from a retracted position to an extended position to eject a completed part from the article-defining cavity 16 as well as the plastic in the runner 24 and the sprue 22.

The mold 10 also includes a gas pin assembly, generally indicated at 30. The gas pin assembly 30 includes a one-piece housing 32. A base portion of the housing 32 is threadedly secured to the second mold half 14 at the interior surface 20 of the second mold half 14 so that the gas pin assembly 30 can be readily removed from the second mold half 14 in the open position of the mold 10. A rubber O-ring is typically provided about the base portion of the housing 32 to seal the housing 32 within the second mold half 14.

Preferably, the housing 32 also includes a hexagonal head portion so that the assembly 30 can be readily removed from the second mold half 14 in the open position of the mold 10 by a conventional tool (not shown). The housing 32 includes an elongated aperture formed therein in communication with and aligned with the gas passageway 18 to permit the flow of gas therethrough.

The base portion of the housing 32 is also internally threaded to threadedly secure therein a holding device in the form of a set screw 42 which has a gas hole formed completely therethrough to permit the flow of gas therethrough.

The gas pin assembly 30 also includes a porous insert 48 comprising a sintered material such as aluminum, copper, nickel, steel, bronze, porcelain, and brass which permits the flow of gas therethrough but prevents the passage of molten plastic therethrough. The insert 48 is held in position within the aperture by the set screw 42 at one end thereof and by flanges of the head portion at the opposite end thereof. The sintered material is preferably a bronze sintered material and can filter out foreign particles down to 20 microns. However, the micron size can be varied depending on the type of plastic utilized in the molding process. The set screw 42 is continuously adjustably secured within the base portion 34 of the housing 32 along the aperture 40 to permit inserts of varying sizes and micron sizes to be located within the aperture 40.

Figure 2:
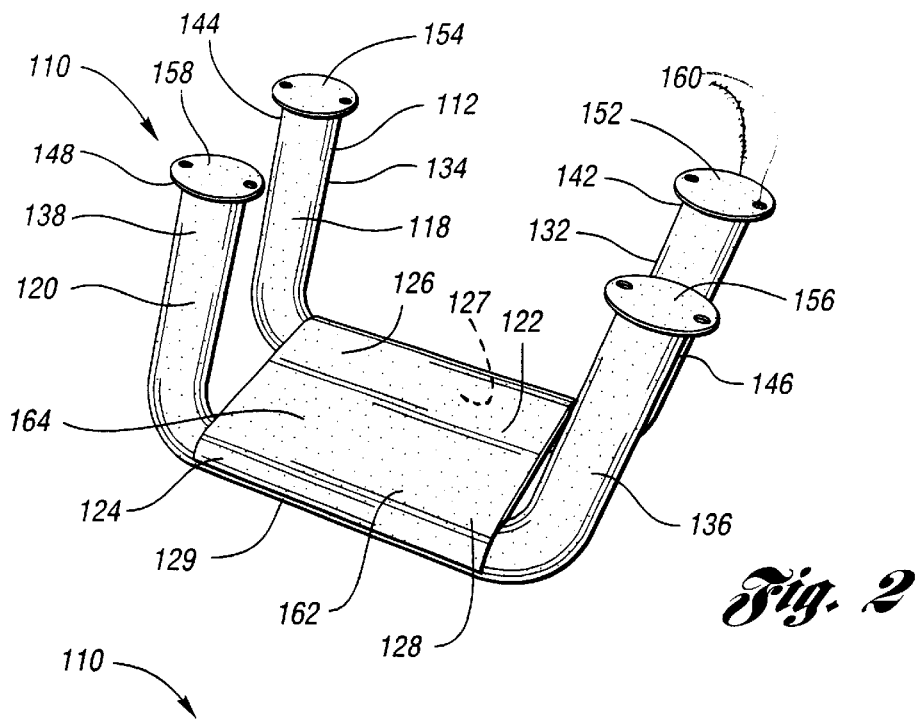
FIG. 2 is a perspective view of a step for entering and exiting a vehicle made by the mold of FIG. 1.

FIG. 2 illustrates a step 110 for entering and exiting a vehicle made by mold 10 in a gas-assisted injection molding system, wherein the step 110 is a unitary, one-piece molding. Step 110 includes first and second U-shaped portions 118, 120 having first and second receiving bodies 122, 124, respectively. First U-shaped portion 118 includes first inner portion 126 and first outer portion 127, and second receiving body 124 includes second inner portion 128 and second outer portion 129. Extending from each of the receiving bodies 122, 124 are legs 132 and 134, 136 and 138, respectively. As shown in FIG. 2, each of legs 132, 134, 136, 138 has ends 142, 144, 146, 148, respectively, to which flanges are attached. Flanges 152, 154, 156, 158 are configured to be mounted to the vehicle (not shown) by way of apertures 160 formed through each of the flanges.

Figure 3:
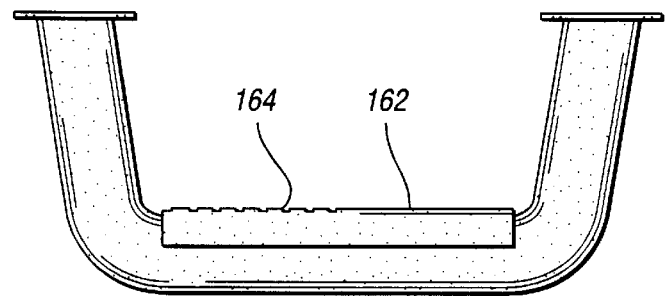
FIG. 3 is a front view of the step of FIG. 2.

As shown in FIGS. 2 and 3, step 110 further includes plate portion 162 which is formed on inner portions 126, 128 of receiving bodies 122, 124, respectively. Thus the first and second U-shaped portions 118, 120 are joined together by plate portion 162. As shown in FIG. 3, plate portion 162 includes treads 164 formed thereon. Treads 164 provide additional traction for a user placing weight onto plate portion 162.

Figure 4:
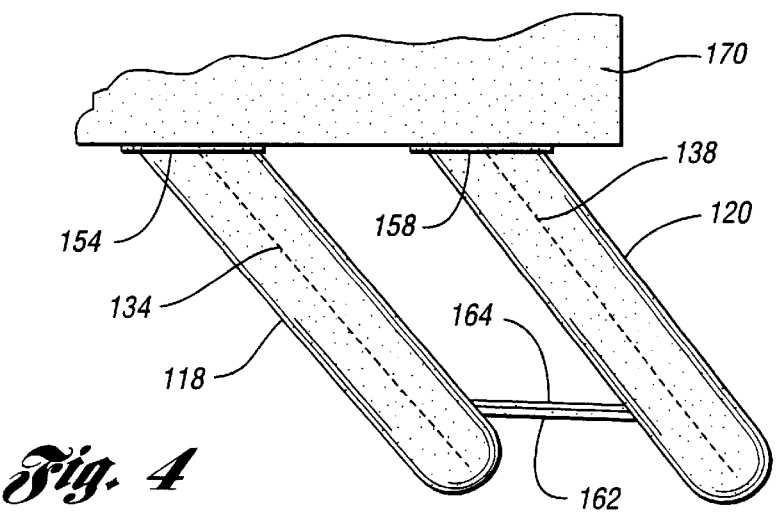
FIG. 4 is a side view of the step of FIG. 2.

As shown in FIG. 4, the legs of each respective U-shaped portion 118, 120 extend from the respective receiving body 122, 124 on an angle. In this embodiment, legs 132 and 134 of U-shaped portion 118 and legs 136 and 138 of U-shaped portion 120 extend from the respective receiving body 122, 124 at substantially the same angle, resulting in a substantially parallel relationship. As shown, when flanges 152, 154, 156, 158 are mounted to underside 170 of the vehicle (not shown), step 110 extends outwardly from the vehicle in order to more easily accommodate a user to step thereon during entering and exiting the vehicle. However, it is to be noted that the legs may extend from the respective receiving body on any other angle which does not fall beyond the scope or spirit of this invention.

In use, step 110 may be mounted adjacent a door or hatch of a vehicle to allow for a user to apply weight thereon to assist in entering and exiting the vehicle. For example, the user may place one or both feet on plate portion 162. Such application may be ideal for utility vehicles. However, step 110 may be used for any vehicle.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A step for entering and exiting a vehicle comprising:
   a unitary, one-piece molding made of plastic having:
      at least two hollow U-shaped portions, each portion having a receiving body section and first and second legs extending from the body section to first and second distal ends respectively, each distal end having a flange configured to be mounted to the vehicle; and
      a plate portion on the respective receiving body section between the first and second legs for supporting weight placed thereon and integrally bridging and joining the at least two U-shaped portions together.

2. The step for entering and exiting a vehicle of claim 1 wherein the first and second legs of each U-shaped portion extend from the body section substantially parallel with each other and with the other respective first and second legs, the legs configured to slant a first direction when mounted to the vehicle, thereby providing the plate portion to support weight placed thereon.

3. The step for entering and exiting a vehicle of claim 1 wherein the first and second legs of each U-shaped portion extend from the body section to define inner and outer portions of the body section, the plate portion disposed on the inner portion of the body section.

4. The step for entering and exiting a vehicle of claim 1 wherein the plate portion has treads formed thereon for user traction.

5. The step for entering and exiting a vehicle of claim 1 wherein each flange includes an aperture formed therethrough for mounting the step to the vehicle.

6. A step mounted to a vehicle for entering and exiting the vehicle comprising:
   a unitary, one-piece molding made of plastic having:
      at least two hollow U-shaped portions, each portion having a receiving body section and first and second legs extending from the body section to first and second distal ends respectively, each distal end having a flange configured to be mounted to the vehicle; and
   a plate portion on the respective receiving body section between the first and second legs for supporting weight placed thereon and integrally bridging and joining the at least two U-shaped portions together wherein the step is manufactured by gas assist injection molding.

* * * * *